United States Patent [19]

Priaroggia

[11] Patent Number: 4,725,121
[45] Date of Patent: * Feb. 16, 1988

[54] SUBMARINE OPTICAL FIBER CABLE WITH CENTRAL TENSION MEMBER AND FILLED WITH INCOMPRESSIBLE FLUID

[75] Inventor: Paolo G. Priaroggia, Milan, Italy

[73] Assignee: Societa' Cavi Pirelli S.p.A., Milan, Italy

[*] Notice: The portion of the term of this patent subsequent to Sep. 1, 2004 has been disclaimed.

[21] Appl. No.: 831,650

[22] Filed: Feb. 20, 1986

Related U.S. Application Data

[63] Continuation-in-part of Ser. No. 723,039, Apr. 15, 1985, Pat. No. 4,680,498.

[30] Foreign Application Priority Data

Feb. 26, 1985 [IT] Italy ................................ 19654 A/85

[51] Int. Cl.⁴ ................................................. G02B 6/44
[52] U.S. Cl. ................................ 350/96.23; 170/70 R
[58] Field of Search ........................................ 350/96.23

[56] References Cited

U.S. PATENT DOCUMENTS

| | | | |
|---|---|---|---|
| 4,361,381 | 11/1982 | Williams | 350/96.23 |
| 4,381,140 | 4/1983 | van der Hoek et al. | 350/96.23 |
| 4,389,088 | 6/1983 | Trezequet | 350/96.23 |
| 4,408,828 | 10/1983 | Le Hoane et al. | 350/96.23 |
| 4,422,889 | 12/1983 | Trezequet et al. | 350/96.23 X |
| 4,491,386 | 1/1985 | Negishi et al. | 350/96.23 |
| 4,623,218 | 11/1986 | Laurette et al. | 350/96.23 |

FOREIGN PATENT DOCUMENTS

| | | | |
|---|---|---|---|
| 2021282 | 11/1979 | United Kingdom | 350/96.23 |
| 2040063 | 8/1980 | United Kingdom | 350/96.23 |
| 1598540 | 9/1981 | United Kingdom | 350/96.23 |

*Primary Examiner*—Eugene R. LaRoche
*Assistant Examiner*—James C. Lee
*Attorney, Agent, or Firm*—Brooks Haidt Haffner & Delahunty

[57] ABSTRACT

A submarine cable with optical fibers which prevents damage to the fibers due to water pressure without the use of an external armor. The cable has a central core with a strand which provides the cable tensile strength and which is surrounded and contacted by a layer of plastic material which has helical grooves which receive the optical fibers which may have a protective covering. The layer of plastic material is surrounded by sheath in the form of a layer of plastic material. The grooves and any spaces radially inwardly of the sheath, such as the spaces between the wires of the strands, are filled with a substantially incompressible fluid, such as a grease or jelly. If the optical fiber protective layer is a tube loosely receiving the optical fiber, or optical fibers, the space within the tube not filled by optical fibers is filled with a substantially incompressible fluid. The layer of plastic material forming the sheath may at least partially extend into the grooves.

10 Claims, 3 Drawing Figures

SUBMARINE OPTICAL FIBER CABLE WITH CENTRAL TENSION MEMBER AND FILLED WITH INCOMPRESSIBLE FLUID

This application is a continuation-in-part of my copending application Ser. No. 723,039 filed Apr. 15, 1985, now U.S. Pat. No. 4,690,498, and entitled "Pressure Resistant Submarine Optical Fiber Cable".

The present invention relates to a submarine, optical fiber telecommunication cable adapted to be laid and operated at great sea depths.

Submarine, optical fiber telecommunication cables are subjected to very heavy mechanical stresses but, the optical fibers housed inside them, being very delicate, cannot tolerate even the minimum of mechanical stresses. Optical fibers, in fact, are fragile and hence, easily breakable. Moreover, the presence of any mechanical stresses in them, even of a small size, can cause an attenuation of the transmitted signals. Any rupturing of the optical fibers and attenuation of the transmitted signals, makes the cable unsatisfactory for use.

The main factors which give rise to mechanical stresses in submarine, optical fiber cables, are the following:

(1) the underwater ambient where the cable is operated, which ambient exerts a hydrostatic pressure which increases as the sea-depth increases;

(2) the laying operations which subject the cable to mechanical stresses which increase whenever the laying depth becomes greater due to the greater weight of the length of cable which is in suspension during said operations; and (3) the temperature variations to which the cable can be subjected during its transportation from the manufacturing area to the laying zone, which temperature variations give rise to mechanical stresses in the sheath resulting from the thermal expansion of the core with respect to that of the sheath, because of the differences of the materials which constitute these elements in the known cables.

The known submarine cables are endowed with a metallic, mechanically resistant armoring and a continuous metallic sheath which are disposed around the cable core for protecting the optical fibers housed therein.

As examples of the known submarine, optical fiber cables for telecommunications, there are those which are described in the U.K. Patent Application No. 2,021,282 and in the U.K. Patent Application No. 2,082,790.

In the known cables, the presence of a metallic sheath and of a mechanically resistant armoring around the core, wherein the optical fibers are housed, involves a considerable rigidity with respect to flexing. This is because both the armoring and the metallic sheath are, per se rigid elements with respect to flexing, and also because such elements are disposed in spaced relation to the longitudinal axis of the cable, the latter axis constituting the neutral axis of flexing for the elements.

Moreover, in practice, said rigidity can turn out to be quite unacceptable in the case of the known submarine optical fiber cables used at great depths, for example, at depths of over 1000 meters. In fact, whenever the laying depth is increased, the mechanically resistant armoring, which must have its dimensions enlarged for allowing the cable to resist the greater applied stresses, can only be augmented by adding metallic materials on the outside of the cable and hence, in a position which is still far away from the neutral flexing axis. Hence, the known cables present difficulties when handling and laying them because of their high rigidity.

One object of the present invention is to provide submarine, optical fiber telecommunication cables which, as compared to the known submarine cables and for the same laying depth, have a greater flexibility, less weight per unit length and are not subject to damage when undergoing any temperature variations during their transportation.

The principal object of the present invention is a submarine, optical fiber telecommunication cable which comprises a cylindrical core upon the outermost surface of which helicoidal grooves are present. Inside each groove there is disposed at least one optical fiber, and said cylindrical core is enclosed inside a sheath. The sheath is made of plastic, and the cylindrical core is made of plastic and an armoring fixed to it and disposed in the radially innermost position so that its axis coincides with the cable axis. Said armoring is formed by a compact anti-torsional rope having a cross-section of not less than 50 mm$^2$, and the interspaces between the wires forming the rope and the helicoidal grooves of said core are filled with a substantially incompressible fluid. The said cable is devoid of any watertight metallic sheath and of any armoring which will withstand the mechanical stresses to which the cable is subjected and which is disposed radially outwardly of and surrounds the zone wherein the optical fibers are disposed.

In this text, by the term "substantially incompressible fluid" is meant a liquid, preferably viscous, substance which may have a high viscosity. Gases are excluded from the scope of this term.

The compact anti-torsional rope constituting the armoring of a submarine cable according to the invention, is selected for substantially totally resisting tractional stresses during the laying operation, and its cross-section is not less than 50 mm$^2$.

Moreover, in a cable according to the invention, the optical fibers can be loosely contained in small tubes filled with a substantially incompressible fluid and housed in the core grooves which are also filled with a substantially incompressible fluid.

As an alternative, the plastic material of the cable sheath can penetrate into the grooves so as to fill them, the sheath having ribs which assume a profile complementary to that of the small tubes.

Other objects and advantages of the present invention will be apparent from the following detailed description of the presently preferred embodiments thereof, which description should be considered in conjunction with the accompanying drawings in which.

Figure 1:
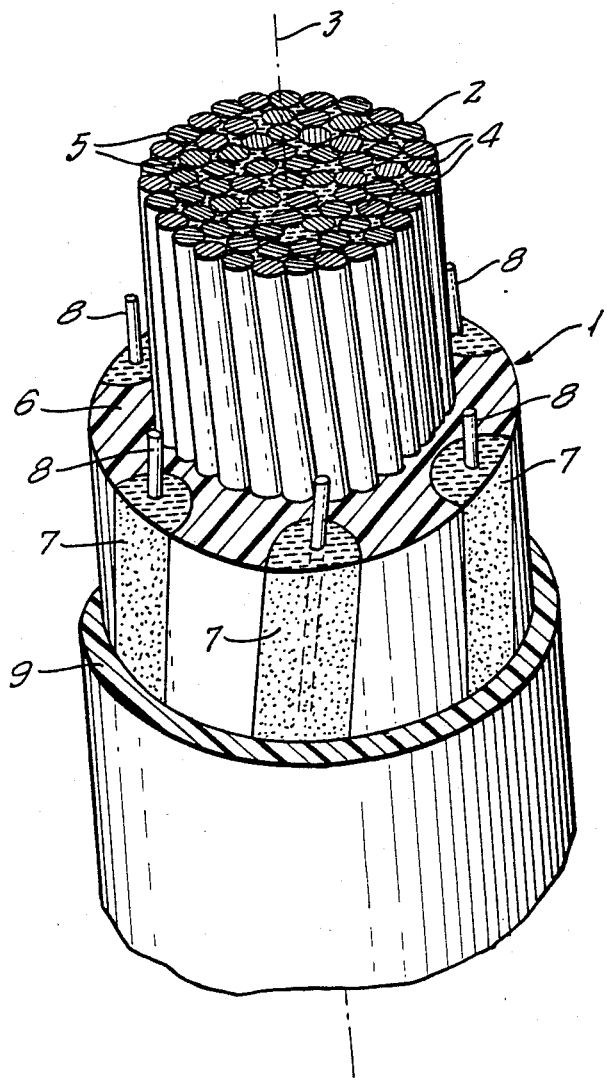
FIG. 1 is a perspective view of a cable of the invention with portions removed for illustration purposes.

As shown in the drawing, the cable comprises a cylindrical core 1 which includes a plastic layer 6 which surrounds and is secured to an armoring 2 which is disposed in such a way as to occupy the radially innermost portion of the core 1. The axis of the armoring 2 coincides with the longitudinal axis 3 of the cable. The armoring 2 is selected, and hence, dimensioned, to resist substantially all the tractional stresses which are encountered by the cable during the laying operations.

In particular, the armoring 2 is formed by a compact antitorsional rope having a cross-section which is not less than 50 mm$^2$ and is formed by wires 4 made of a material which has a high mechanical resistance to traction, such as, for example, steel, aromatic polyamids and carbon-fibers. The wires 4 of the rope 2, are disposed helicoidally, in coaxial superimposed layers, and the winding direction of the wires of one layer is, preferably, opposed to that of the wires in the adjacent layer. With such disposition of the wires 4 and when the rope 2 is subjected to tension, the rope 2 does not undergo torsions and has a good flexibility. The spaces 5 between the wires 4 are filled with a substantially incompressible fluid, such as, for example, petroleum jelly, silicone grease and the like.

On the outer surface of the layer 6, which defines the outer surface of the cable core 1, there are helical grooves 7 which can have, as desired, either a closed helix or an open helix configuration, the latter term meaning that the lay-out of each groove is comprised by alternating S-shaped lengths or Z-shaped lengths.

Optical fibers 8 are loosely received in the grooves 7, and such grooves 7 are completely filled with the same, substantially incompressible fluid which is used to fill the spaces 5 between the wires 4 of the rope 2. Preferably, the grooves 7 have a width, as measured at the outer surface of the layer 6, as well as a depth measured from such surface, of not over 5 mm.

Plastic materials for forming the layer 6 can be selected, for example, from among the polyolefins, for example, polyethylene and polypropylene, or from among the aliphatic polyamids, and the like.

Preferably, the layer 6 is an aliphatic polyamid since such material renders the layers 6 of the cable radially less contractile under the action of hydrostatic pressure. In this manner, there is obviated, along the cable, any resulting small variations in the dimensions of the grooves 7 and hence, any longitudinal movements of the substantially incompressible fluid which fills the grooves 7.

The cable core 1 is surrounded by a sheath 9 which can be made of a plastic material which is the same as, or different from, the plastic material used for the layer 6. The sheath 9 closes the grooves 7, and it is disposed in direct contact with the outer surface of said plastic layer 6. For forming the cable sheath 9, there can be used, for example, polyolefins, such as, polyethylene and polypropylene, aliphatic polyamids, and the like. Preferably, the sheath 9 is made of an aliphatic polyamid.

If desired, a binding of plastic tapes can be interposed between the layer 6 and the plastic sheath 9 of the cable when, at the time of manufacturing the latter, the leaking out of the substantially incompressible fluid from the grooves 7 is anticipated. Such tapes would be applied to the core 1 prior to applying the plastic sheath 9 over the cable core 1.

Over the plastic sheath 9, other elements (not shown in the drawing) can be applied. Such elements may be, for example, antishipworm protections of the per se known type, or windings of metal tapes of good electrical conductivity (either insulated or not), but none of these elements should, by its presence, provide either a water-tight metallic sheath or a mechanically resistant armoring of sufficient resistance to, by itself, protect the optical fibers.

By such construction, a cable according to the invention is devoid of any water-tight metallic sheath and of any armoring which is disposed radially externally to the core 1 of the cable itself, which surrounds the zone where the optical fibers are placed and which, by itself, can withstand the mechanical stresses to which the cable is subjected.

Figure 2:
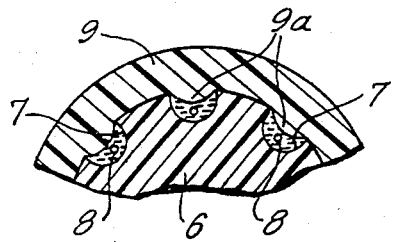
FIG. 2 is fragmentary cross-section of a modified embodiment of a cable of the invention.

In the embodiment shown in FIG. 1, the sheath 9 does not extend into the grooves 7. If desired, the sheath 9 may have ribs 9a which extend part way into the grooves 7 as illustrated in FIG. 2.

Figure 3:
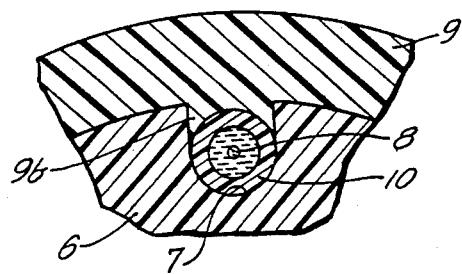
FIG. 3 is a fragmentary cross-section of a further modified embodiment of the cable of the invention.

According to an alternative embodiment shown in FIG. 3, the optical fibers 8 are loosely contained inside small tubes 10 which are made, for example, of plastic or other materials and which are filled with a substantially incompressible fluid, and the tubes 10 are received in the grooves 7 of the core 1. Any space in the grooves 7 which may be left void by the small tubes 10 is either also filled with a substantially incompressible fluid, or else, it is filled up with the plastic material of the sheath 9. In the latter case, the plastic sheath 9 of the cable, has in correspondence of the grooves 7, ribs 9b with a profile having a form which is complementary to that of the small tubes 10 as illustrated in FIG. 3.

As a further alternative embodiment, the cable armoring 2, in the form of a compact anti-torsional rope 2, can comprise a longitudinal metallic element having a high electrical conductivity which may be used as an electrical conductor for feeding electrical power to the optoelectronic repeaters for the signals transmitted by the optical fibers, which are disposed along the cable.

For example, the longitudinal metallic element having a high electrical conductivity may be at least one connected copper wire which, for example, may replace one of the wires 4 or else, be wound around the rope 2 which forms the armoring of the cable.

The return conductor can be the sea, or as an alternative, the return conductor can be a combination of the sea and of a metal tape of good electrical conductivity which is wound around the sheath 9.

According to another alternative, the return conductor may be a metal tape of good electrical conductivity, interposed between the core 1 and the plastic sheath 9 of the cable, or may be such a metal tape incorporated in said cable sheath 9, e.g. embedded therein.

In a further embodiment, which may be used in the case where no longitudinal metallic element having a high electrical conductivity, is associated with the cable armoring, the feeding of the optoelectronic repeaters can be had through an electrical circuit which comprises an insulated metal tape of good electrical conductivity wound around the sheath, and the sea may be utilized as a return conductor.

However, no matter what the configuration is, said metallic elements (either insulated or not), disposed either under, around or inside the plastic sheath 9 of the cable, must provide neither a metallic water-tight sheath nor a mechanically resistant armoring for the cable.

From description given hereinbefore and from the following considerations, it will be understood that, by means of the cables according to the invention, the stated objects can be achieved.

In the submarine, optical fiber telecommunication cables according to the invention, no metallic elements which are intended to absorb the stresses to which the cable is subjected is to be formed around the core wherein the optical fibers are disposed. In fact, the armoring is disposed at the radially innermost zone of the cable, close to the longitudinal axis of the cable, and the sheath is made out of plastic and not out of any metallic material as in the known cables of the same type.

As a consequence, the flexibility of the cables according to the invention is greater, when compared to that of the known cables, both, because the armoring is disposed exclusively in the vicinity of the longitudinal axis of the cable which is the neutral axis of flexing and also because the plastic sheath is more flexible than a metallic sheath.

In this manner, there is obtained a reduction of weight per unit length of the cable as compared with the known cables.

Moreover, even in the absence of a mechanically resistant armoring around the core wherein the optical fibers are disposed, no risks are to be feared that the cable structure collapsing under the action of hydrostatic pressure, even at great sea-depths.

In fact, the resistance to hydrostatic pressure in the cables according to the invention, is ensured by the fact that no spaces devoid of solid or substantially incompressible material exist in the cable structure since both the interspaces between the wires of the rope 2 which forms the mechanically resistant armoring, as well as the grooves 7 or the tubes 10 housing the optical fibers, are filled with a substantially incompressible fluid. Moreover, the radially innermost surface of the plastic sheath 9 adheres perfectly to the cable core, without leaving any interstices.

Moreover, the absence of any armoring around the cable core eliminates the danger which exists in the known cables, namely, an armoring around the core can compress the cable core and hence, cause stresses in the optical fibers when, during the laying operation, said armoring tends to grip the core, due to the effects of the tensile stresses imposed on it.

In cables according to the invention, the sheath is made out of plastic and not out of a metallic material as is the case for the known submarine optical fiber cables.

In the known cables, the presence of a continuous, metallic, water-tight sheath for surrounding the zone that is occupied by the optical fibers has been considered, to this time, indispensible for preventing even small traces of water from penetrating into the cable and reaching the optical fibers with the resulting attenuations of the transmitted signals and breakages.

In the cable according to the invention, in spite of the presence of a plastic sheath which cannot guarantee an impermeability equal to that of a continuous metallic sheath, there have not been found, in practice, any of the drawbacks for the optical fibers which would be forecast when such metallic sheath is omitted.

Moreover, in the cables according to the invention, the elimination of the continuous and water-tight metallic sheath, which is replaced by a plastic sheath, renders these cables free of the dangers resulting from the temperature variations to which a cable can be subjected, during its transportation from the manufacturing zone to the cable-laying zone. In fact, as compared to a metallic sheath, a plastic sheath has a greater ability for expansion. Therefore, owing to the expansibility of a plastic sheath, there are no dangers of ruptures and crackings as could occur with metallic sheaths whenever the thermal expansions of the components, which are enclosed inside the sheath, are caused by temperature increases which could occur due to a direct exposure of the cables to the sun.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, telecommunication cable comprising:
    a core comprising an axially disposed and extending armor formed by a strand of wires and a layer of plastic material around and adhering to said strand, said plastic layer having a plurality of spaced-apart, helical grooves therein extending longitudinally of said core and opening radially outwardly and said strand of wires having, by itself, a tensile strength sufficient to withstand the tensile stresses to which the cable is subjected during laying and recovery thereof;
    a substantially incompressible fluid disposed in and filling-up any otherwise empty spaces within said layer of plastic material including any spaces between said wires;
    at least one optical fiber loosely received in each of said grooves;
    a substantially incompressible fluid disposed in and filling-up any otherwise empty spaces in said grooves;
    a sheath of plastic material around said core, said sheath, by itself, having a resistance to compression which is insufficient to withstand the compression forces to which the cable is subjected during use; and
    said cable being without armor externally of said layer of plastic material which, by itself, can withstand the mechanical stresses to which the cable is subjected in use;
    whereby said cable is able to withstand hydrostatic pressures to which it is subjected when submerged without any armor outwardly of the optical fiber or fibers which by itself can withstand such pressures.

2. A submarine, telecommunication cable as set forth in claim 1, wherein said strand of wires has a cross-sectional area of at least 50 square millimeters.

3. A submarine, telecommunication cable as set forth in claim 1, wherein said plastic material of said plastic sheath is a plastic material selected from the group consisting of polyolefins and aliphatic polyamids.

4. A submarine, telecommunicable cable as set forth in claim 1, wherein said sheath has portions in the form of ribs extending into said grooves.

5. A submarine telecommunication cable as set forth in claim 1, wherein said grooves at the outer surface of said layers of plastic, each have a width not greater than 5 mm and have a depth from said outer surface not greater than 5 mm.

6. A submarine, telecommunication cable as set forth in claim 1, wherein each of said optical fibers has a protective covering therearound.

7. A submarine, telecommunication cable as set forth in claim 6, wherein said protective covering is a tube having an inner diameter greater than the outer diameter of the optical fiber, the tube being received in a said groove and the space within each said tube not filled by an optical fiber being filled with a substantially incompressible fluid.

8. A submarine, telecommunication cable as set forth in claim 7, wherein said sheath fills any space in a said groove which is not filled by a said tube.

9. A submarine, telecommunication cable as set forth in claim 8, wherein said conductor is a copper wire.

10. A submarine, telecommunication cable as set forth in claim 1, wherein said armor further comprises a conductor having a conductivity greater than said wires.

* * * * *